(12) United States Patent (10) Patent No.: US 7,965,074 B2
Nakagawa et al. (45) Date of Patent: Jun. 21, 2011

(54) POSITION SENSOR AND BIAS MAGNETIC FIELD GENERATING DEVICE

(75) Inventors: Nobuhiro Nakagawa, Tokyo (JP); Gunichi Nakamura, Kanagawa (JP); Masaaki Kusumi, Tokyo (JP)

(73) Assignee: Mori Seiki Co., Ltd., Nara (JP)

( * ) Notice: Subject to any disclaimer, the term of this patent is extended or adjusted under 35 U.S.C. 154(b) by 334 days.

(21) Appl. No.: 12/255,015

(22) Filed: Oct. 21, 2008

(65) Prior Publication Data

US 2009/0116151 A1 May 7, 2009

(30) Foreign Application Priority Data

Oct. 22, 2007 (JP) ................. P2007-274092

(51) Int. Cl.
*G01B 7/14* (2006.01)
(52) U.S. Cl. ................................. 324/207.21
(58) Field of Classification Search .... 360/324.1–324.2, 360/321–322, 113, 78.04, 78.12; 324/249, 324/244, 212, 235, 260, 252, 207.21, 207.12, 262, 208
See application file for complete search history.

(56) References Cited

U.S. PATENT DOCUMENTS 5,243,280 A * 9/1993 Kusumi .................. 324/207.21
5,909,115 A * 6/1999 Kano et al. ............. 324/207.21

FOREIGN PATENT DOCUMENTS

JP 08-068661 3/1996

\* cited by examiner

*Primary Examiner* — Huy Phan
*Assistant Examiner* — Tung X Nguyen
(74) *Attorney, Agent, or Firm* — SNR Denton US LLP

(57) ABSTRACT

Disclosed herein is a position sensor including, a magnetic recording medium including two incremental layers and an absolute layer, the absolute layer provided between the incremental layers, each of the layers having magnetic information recorded therein, and a magnetic detection section including three magnetoresistance effect devices opposite to the layers of the magnetic recording medium, being moved relative to the magnetic recording medium in the extending direction of the layers, and being operative to detect the magnetic information in the layers by the magnetoresistance effect devices.

6 Claims, 6 Drawing Sheets

POSITION SENSOR AND BIAS MAGNETIC FIELD GENERATING DEVICE

CROSS REFERENCES TO RELATED APPLICATIONS

The present invention contains subject matter related to Japanese Patent Application JP 2007-274092 filed in the Japan Patent Office on Oct. 22, 2007, the entire contents of which being incorporated herein by reference.

BACKGROUND OF THE INVENTION

1. Field of the Invention

The present invention relates to a position sensor such as magnetic scales and rotary encoders, to be applied to machine tools, industrial machines, precision length/angle measuring instruments, etc. and a bias magnetic field generating device to be used in the position sensor.

2. Description of the Related Art

Hitherto, as a detection head of a position sensor such as magnetic scales and rotary encoders to be applied to machine tools, industrial machines, precision length/angle measuring instruments, etc., a magnetoresistance effect device (MR device) which utilizes the magnetoresistance effect of a thin film of Fe—Ni, Ni—Co or the like has been used.

The scales and rotary encoders using the MR device-based detection heads vary widely in shape and structure according to the purpose, use or the like thereof. Among the scales and rotary encoders, those which need high accuracy and high resolution are fundamentally so configured that the pitch (recording wavelength) of magnetic recording is shortened or the output waveform of the MR sensor is controlled to have a reduced harmonic distortion and an enhanced signal-to-noise ratio (S/N) so as to reduce errors at the time of interpolation within one wavelength, thereby realizing high accuracy and high resolution.

In addition, in such a detection head as above-mentioned, it is known that still higher accuracy and higher resolution can be realized by providing the MR sensor with a bias magnet so as to generate a bias magnetic field.

Meanwhile, the above-mentioned type of position sensor has a magnetic recording medium with magnetic information recorded thereon at a position opposed to the MR sensor, and position detection is performed by detecting the magnetic information on the magnetic recording medium by the MR sensor when the MR sensor and the magnetic recording medium are moved relative to each other. As the magnetic recording medium to be used in this type of position sensor, one that includes an incremental layer and an absolute layer has been proposed. The magnetic recording medium including the incremental layer and the absolute layer is generally of a two-track configuration in which one incremental layer and one absolute layer are provided in parallel to each other. Further, for the purpose of reducing the phase difference between the absolute layer and the incremental layer, there has been proposed a magnetic recording medium of a three-track configuration in which two incremental layers and one absolute layer interposed therebetween are arranged in parallel to each other.

Here, in the case where the position sensor including the detection head for detecting the magnetic information recorded on the magnetic recording medium having a plurality of tracks is provided with the above-mentioned bias magnetic field generating section, the MR sensors corresponding respectively to the absolute layer and the incremental layer(s) can be supplied only with the same bias magnetic field. Therefore, if the bias magnetic field is designed according to the incremental layer, the sensitivity of the MR sensor in relation to the absolute layer would be lowered and the accuracy in detecting the magnetic information would be worsened. On the other hand, if the bias magnetic field is designed according to the absolute layer, interpolation accuracy and return error with regard to the incremental layer are worsened considerably.

[Patent Document 1]
Japanese Patent Laid-open No. Hei 8-68661

SUMMARY OF THE INVENTION

Thus, there is a need for a position sensor, such as magnetic scales, encoders, etc. configured to obtain high accuracy by use of an MR device-based detection head, which is improved to realize a still higher accuracy. There is also a need for a bias magnetic field generating device to be applied to the position sensor.

In accordance with an embodiment of the present invention, there is provided a position sensor including: a magnetic recording medium including two incremental layers and an absolute layer, the absolute layer provided between the incremental layers, each of said layers having magnetic information recorded therein; and a magnetic detection section including three magnetoresistance effect devices opposite to the layers of the magnetic recording medium, being moved relative to the magnetic recording medium in the extending direction of the layers, and being operative to detect the magnetic information in the layers by the magnetoresistance effect devices, wherein the magnetic detection section has a bias magnetic field generating section disposed opposite to the magnetoresistance effect devices and operative to generate bias magnetic fields corresponding to the magnetoresistance effect devices.

In accordance with another embodiment of the present invention, there is provided a bias magnetic field generating device to be applied to a position sensor, the position sensor including: a magnetic recording medium including two incremental layers and an absolute layer, the absolute layer provided between the incremental layers, each of the layers having magnetic information recorded therein; and a magnetic detection section including three magnetoresistance effect devices opposite to the layers of the magnetic recording medium, being moved relative to the magnetic recording medium in the extending direction of the layers, and being operative to detect the magnetic information in the layers by the magnetoresistance effect device, wherein the bias magnetic field generating device has a bias magnetic field generating section disposed opposite to the magnetoresistance effect devices of the magnetic detection section and operative to generate bias magnetic fields corresponding to the magnetoresistance effect devices.

According to the above-mentioned embodiments of the present invention, optimum bias magnetic fields can be generated for the magnetoresistance effect devices for detecting the magnetic information in the magnetic recording medium having the absolute layer and the incremental layers. Besides, with regard to the incremental layers, return error and interpolation are most improved, and, with regard to the absolute layer, magnetic information detection can be performed with high accuracy.

DETAILED DESCRIPTION OF THE PREFERRED EMBODIMENTS

Figure 1:
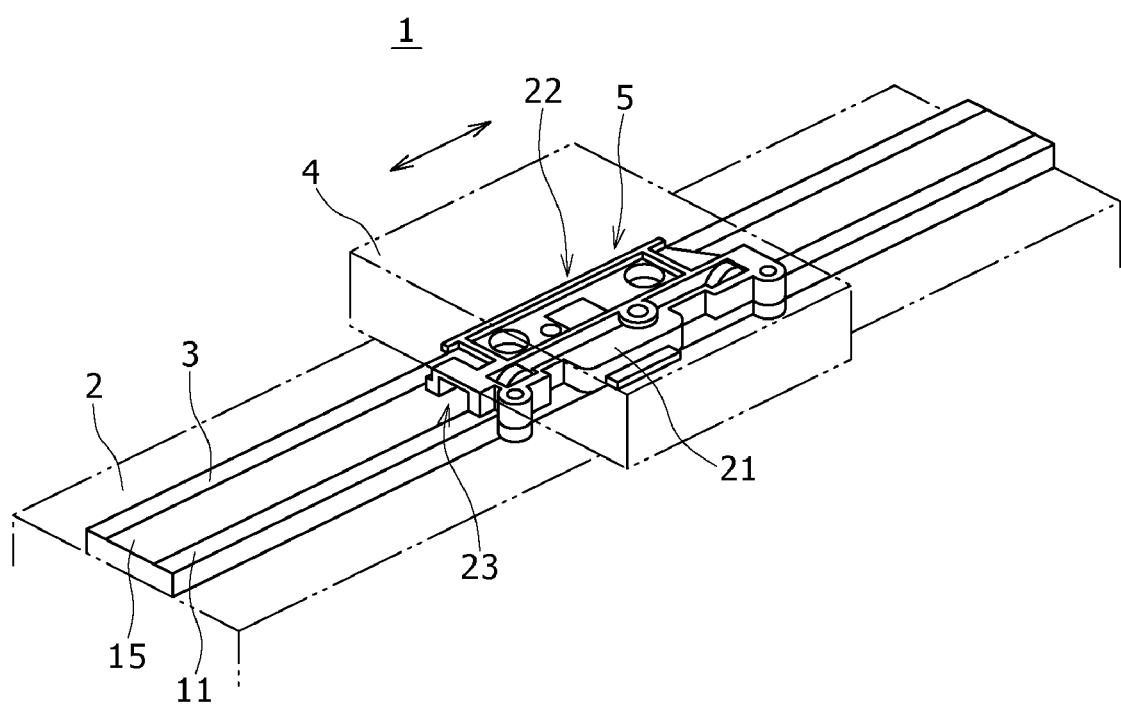
FIG. 1 is an essential part perspective view showing a mounting structure for a position sensor as a first embodiment of the present invention.

Some specific embodiments of the present invention will be described in detail below, referring to the drawings. As shown in FIG. 1, a position sensor 1 according to an embodiment of the present invention, which is provided for a machine tool, an industrial machine, a precision length/angle measuring instrument or the like, includes a scale member 3 mounted to a mount base part 2 provided on the side of a work carrier, for example, of a machine tool, and a sensor unit 5 which is provided on the side of a tool slide 4, disposed opposite to the scale member 3 and operative as magnetic detection means.

When the tool slide 4 is moved relative to the work carrier, the position sensor 1 momentarily detects the relative position, i.e., the position of machining of the work by a cutter mounted to the tool slide 4, and outputs a detection signal to a control unit of the machine tool.

Incidentally, the position sensor 1 is not limited to the above-mentioned structure. For example, the sensor unit 5 and the scale member 3 may be attached, for example, respectively to parts moved in the manner of tracking the motions of the tool slide 4 and the work carrier. In addition, the position sensor 1 may be so configured that, for example, the scale member 3 is mounted to the side of the tool slide 4, and the sensor unit 5 is mounted to the side of the work carrier. Naturally, the position sensor 1 may be mounted not only to the machine tool having the above-mentioned structure but also to machine tools of other structures, and may be mounted to various apparatuses.

Figure 2:
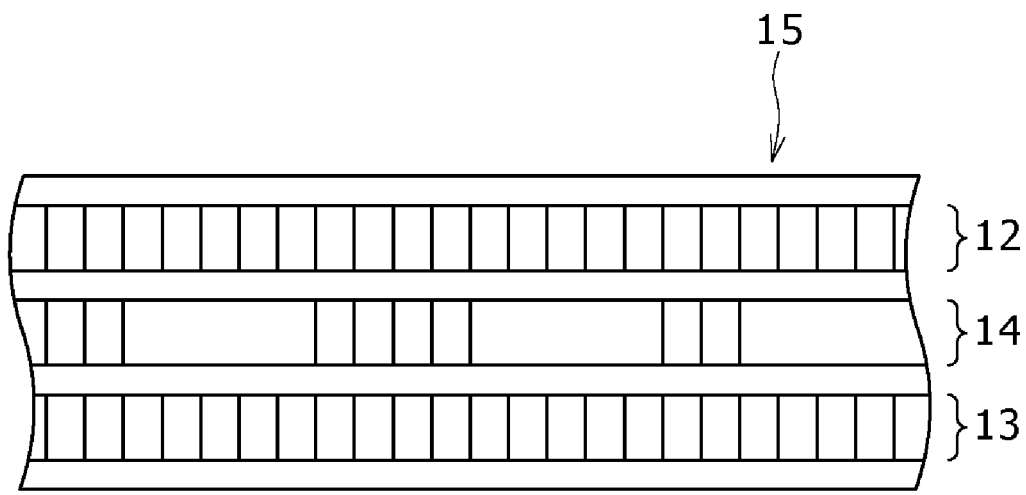
FIG. 2 is a schematic view showing a magnetic signal pattern recorded in a magnetic recording medium of a scale member.
Figure 3:
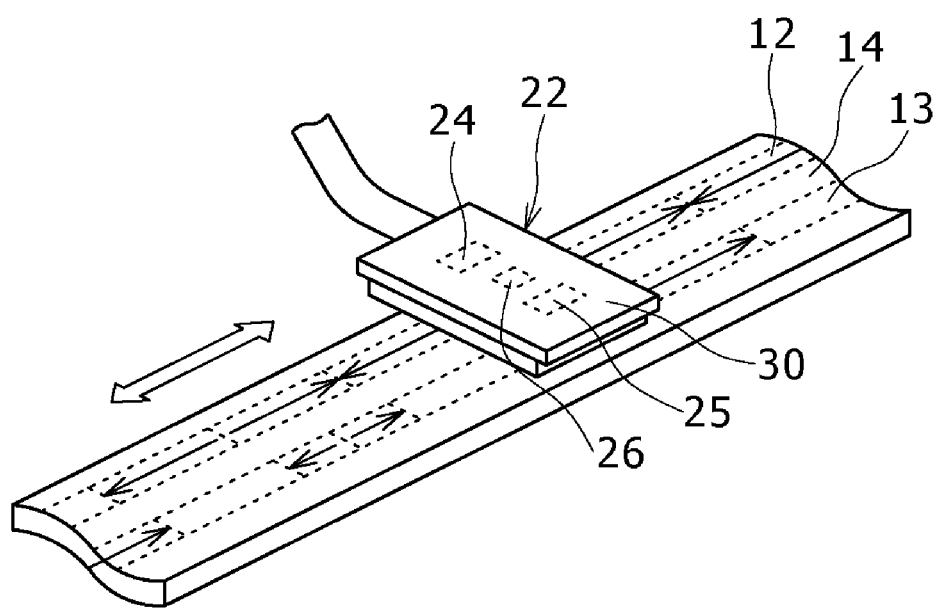
FIG. 3 is an essential part perspective view for showing the positional relationship between a detection head and the scale member.

As shown in FIGS. 2 and 3, the scale member 33 attached to the mount base part 2 of the machine tool includes a long scale base member 11, and a magnetic recording medium 15 which has two incremental layers 12, 13 and an absolute layer 14. The scale member 3 is formed, for example, by a method in which a magnetic material is applied to a surface of the scale base member 11 including a glass base member having a rectangular sectional shape in a coating thickness of 2 to 3 μm by electroless plating, and predetermined patterns are recorded in the magnetic material layer along the longitudinal direction by an ordinary magnetic recording head so as to form the incremental layers 12, 13 and the absolute layer 14 of the magnetic recording medium 15. The scale member 3 is attached to the mount base part 2 by a bolt(s) or the like through a mounting hole(s) provided in the scale base member 11.

The incremental layers 12, 13 and the absolute layer 14 constituting the scale member 3 are so arranged that the absolute layer 14 is interposed between the incremental layers 12, 13. The incremental layers 12, 13 and the absolute layer 14 have magnetic signals recorded therein in the patterns as shown in FIG. 2, respectively. The incremental layers 12, 13 of the scale member 3 each have the magnetic signals recorded therein by, for example, such magnetic polarization that N poles and S poles are alternately formed at regular pitch. In addition, the absolute layer 14 of the scale member 3 is configured, for example, to have magnetic record parts where magnetic information is recorded at positions corresponding to predetermined fixed-point positions, and non-record parts which are located at other positions and have no magnetic information recorded therein.

As shown in FIG. 1, the sensor unit 5 moved relative to the scale member 3 in the longitudinal direction is configured, for example, to have a casing 21 to be attached to a mounting part of the tool slide 4 through an attaching part formed from a synthetic resin material, a detection head 22 mounted on the casing 21 through a support mechanism (not shown) for holding the detection head 22 in a fixed mounted posture, a detection circuit (not shown), etc. The sensor unit 5 is disposed opposite to the scale member 3 through a running guide mechanism 23, and, during when machining of a work is carried out, the sensor unit 5 is reciprocated as one body with the tool slide 4 in the direction of arrows A in FIG. 1.

The detection head 22 of the sensor unit 5 includes three sensors consisting of a first incremental layer sensor 24, a second incremental layer sensor 25, and an absolute layer sensor 26, and a magnetic field generating section 30 disposed as such a position as to be opposed to each of the sensors. Each of the sensors has, for example, a magnetoresistance effect device (MR device). Incidentally, each sensor is not limited to the just-mentioned one, and may be any one insofar as it can detect the magnetic information recorded in the scale member 3 with high accuracy. For example, each sensor may have a magnetoresistance effect device of an artificial lattice film structure. The first incremental layer sensor 24 is disposed opposite to the incremental layer 12 of the scale member 3, with a fixed spacing kept therebetween. The second incremental layer sensor 25 is disposed opposite to the incremental layer 13 of the scale member 3, with a fixed spacing kept therebetween. The absolute layer sensor 26 is disposed opposite to the absolute layer 14 of the scale member 3, with a fixed spacing kept therebetween.

Figure 4A:
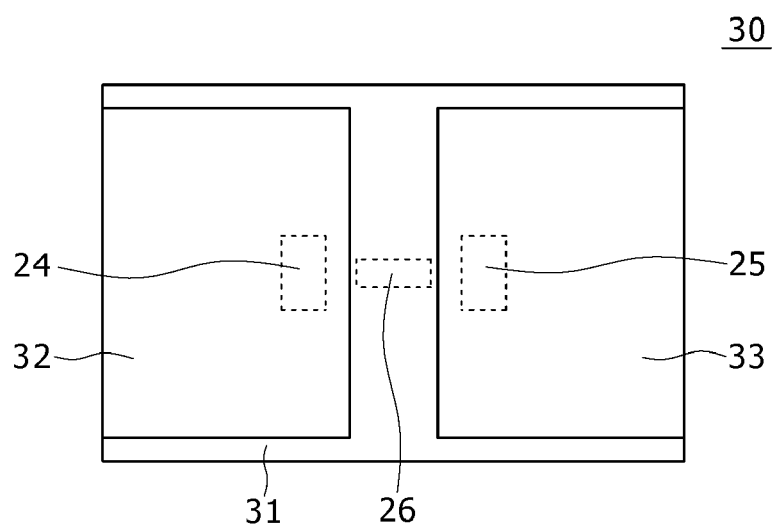
FIG. 4A is a plan view of a magnetic field generating section.
Figure 4C:
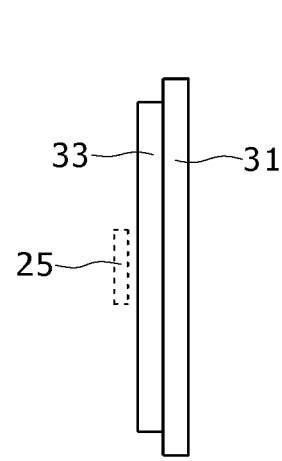
FIG. 4C is a side view of the magnetic field generating section.
Figure 4B:
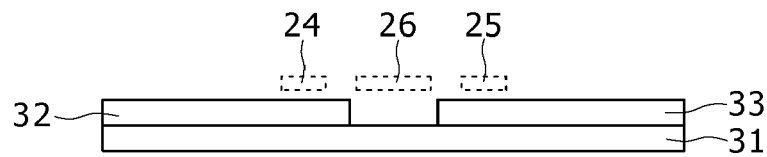
FIG. 4B is a front view of the magnetic field generating section.

The magnetic field generating section 30 is disposed opposite to surfaces, on the opposite side of the surfaces facing the magnetic recording medium 15, of the sensors, and is operative to apply bias magnetic fields to the sensors to which it is opposed. To be more specific, as shown in FIGS. 4A to 4C, the magnetic field generating section 30 includes: an absolute layer bias magnet member 31 disposed opposite to the first and second incremental layer sensors 24, 25 and the absolute layer sensor 26 so as to cover the sensors 24, 25 and 26; a first incremental layer bias magnet member 32 stacked on the absolute layer bias magnet member 31 and disposed opposite to the first incremental layer sensor 24 so as to cover the latter; and a second incremental layer bias magnet member 33 disposed opposite to the second incremental layer sensor 25 so as to cover the latter.

The absolute layer bias magnet member 31 has a thin plate-shaped permanent magnet, having a principal surface so sized as to cover the three sensors 24, 25 and 26, with its major edges orthogonal to the longitudinal direction of the scale member 3 and with its minor edges parallel to the longitudinal direction of the scale member 3. The first incremental layer bias magnet member 32 has a thin plate-shaped permanent magnet, like the absolute layer bias magnet member 31, and is so sized as to cover only the first incremental layer sensor 24, exclusively of the position opposed to the absolute layer 14. The second incremental layer bias magnet member 33 has a thin plate-shaped permanent magnet, like the absolute layer bias magnet member 31, and is so sized as to cover only the second incremental layer sensor 25, exclusively of the position opposed to the absolute layer 14.

Each of the first and second incremental layer bias magnet members 32, 33 has substantially the same thickness as that of the absolute layer bias magnet member 31, and has a width slightly shorter than the minor edges of the absolute layer bias magnet member 31. The magnetic field generating section 30 has a configuration in which the absolute layer bias magnet member 31 and the first and second incremental layer bias magnet members 32, 33 are integrally assembled to have a roughly angular U-shaped overall form, as shown in FIG. 4B, through bonding with an adhesive or the like.

The magnetic field generating section 30 is so arranged that its surface, on the side on which the first and second incremental layer bias magnet members 32 and 33 are provided on the absolute layer bias magnet member 31, is opposed to the sensors 24, 25, 26, with predetermined gaps therebetween.

Figure 5:
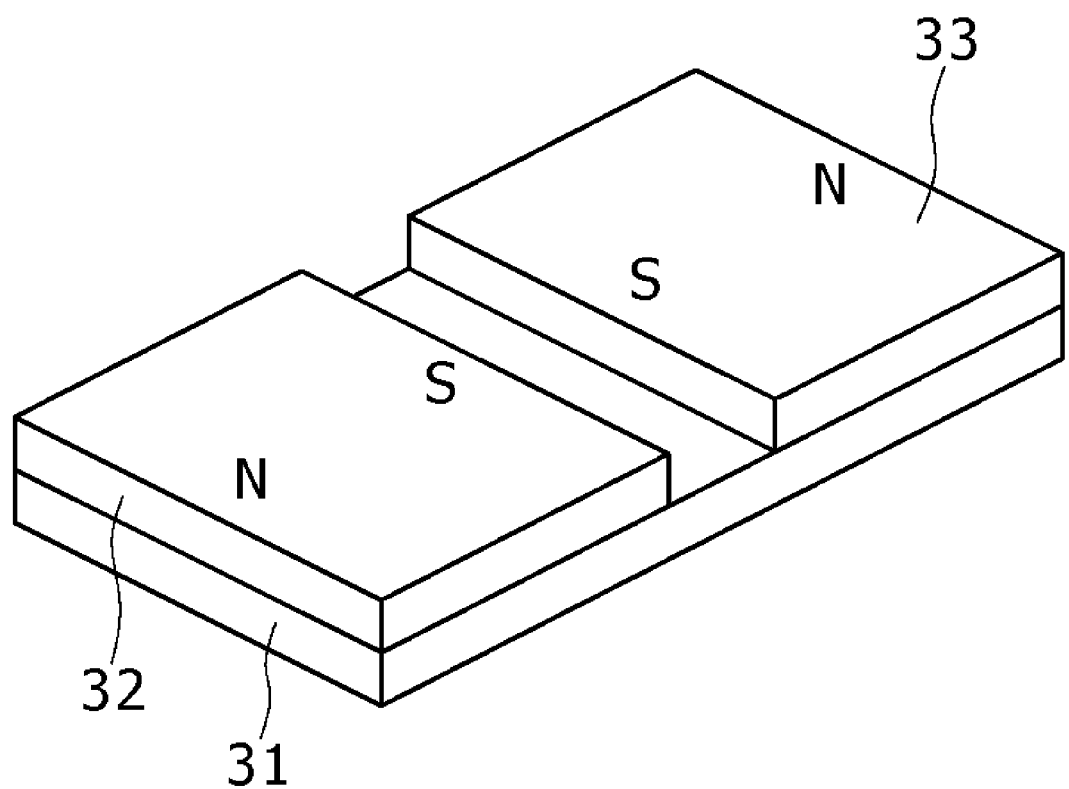
FIG. 5 is a perspective view showing another form of the magnetic field generating section.

In addition, as shown in FIG. 5, the magnetic field generating section 30 has a configuration in which the first incremental layer bias magnet member 32 and the second incremental layer bias magnet member 33 are so arranged as to be different in magnetic polarization sense. In the example shown in FIG. 5, the first incremental layer bias magnet member 32 and the second incremental layer bias magnet member 33 are so formed that their S poles are close to each other.

The magnetic field generating section 30 configured as above is varied in magnet thickness according to the bias magnetic fields to be applied respectively to the sensors 24, 25, 26 disposed opposite thereto. Specifically, the thickness of the bias magnets relevant to the first and second incremental layer sensors 24 and is set to be greater than the thickness of the bias magnet relevant to the absolute layer sensor 26. Furthermore, since the first incremental layer bias magnet member 32 and the second incremental layer bias magnet member 33 in the magnetic field generating section are so arranged that their magnetic polyarization senses are different, the bias magnetic field for the absolute layer sensor 26 interposed therebetween is reduced.

Figure 6:
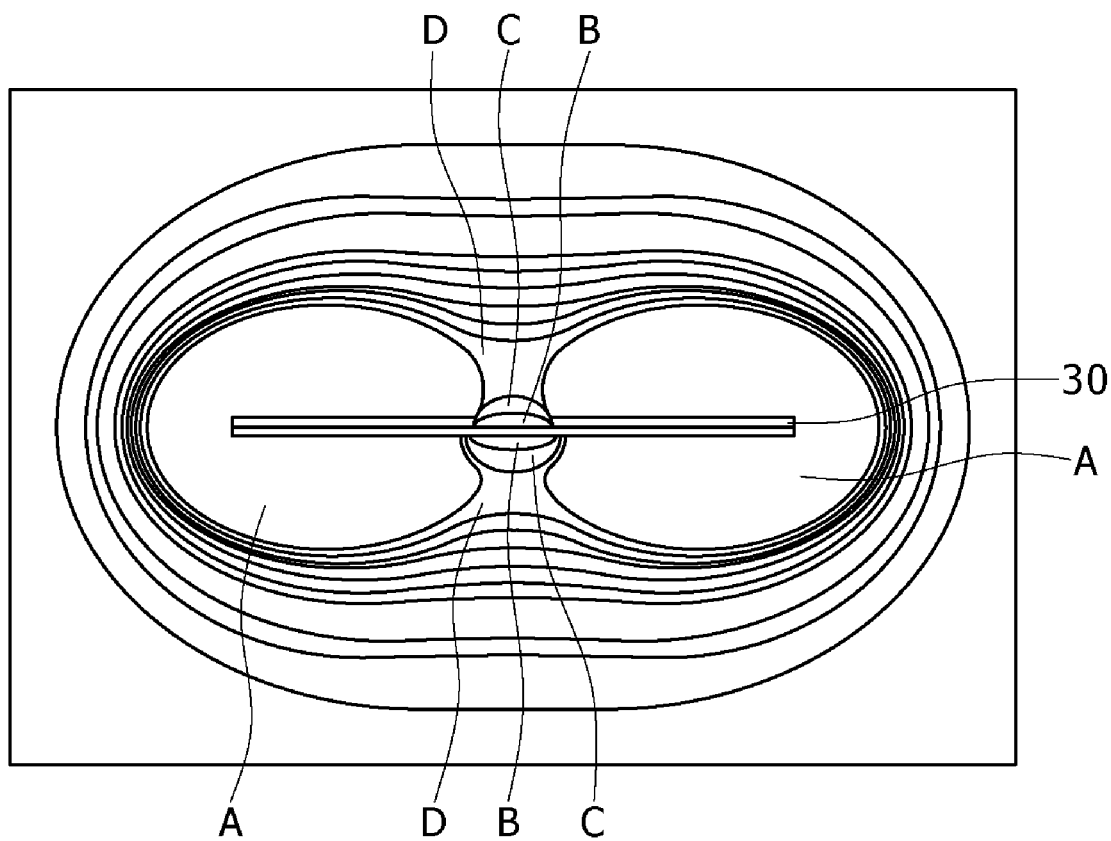
FIG. 6 is a simulation chart of a magnetic field generated by the magnetic field generating section shown in FIG. 4.

As shown in FIG. 6, it is seen that in the magnetic field generating section 30 configured as above, the generation of magnetic field is suppressed in a central area. FIG. 6 shows the results of a simulation of a magnetic field generated in a system in which a magnet sized 9×14×0.5 mm was used as the absolute layer bias magnet member 31, whereas two magnets sized 8×6×0.5 mm were used as the first and second incremental layer bias magnet members 32, 33, to assemble a magnetic field generating section 30 as shown in FIG. 4. From FIG. 6 it is seen that the magnetic field is strongest in regions A most close to the first and second incremental layer bias magnet members 32 and 33, that magnetic fields weaker than those in regions A are generated in regions B, C and D located between the first and second incremental layer bias magnet members 32 and 33, that the magnetic fields generated in the regions B, C and D progressively approach the magnetic fields in regions A in intensity in this order, and that the magnetic field is most suppressed in regions B. Incidentally, in this measurement of magnetic field, magnets with the same magnetic polarization sense were used as the first and second incremental layer bias magnet members 32, 33. The measurement results also verify that the intensity of magnetic field generated varies depending on position.

In the position sensor having the above-described configuration, the scale member is provided which has an absolute layer interposed between two incremental layers, and optimal bias magnetic fields can be generated for the magnetoresistance effect devices for detecting magnetic information recorded on a magnetic recording medium. Besides, with regard to the incremental layers, return error and interpolation are most improved, and, with regard to the absolute layer, magnetic information detection can be performed with high accuracy.

Figure 7:
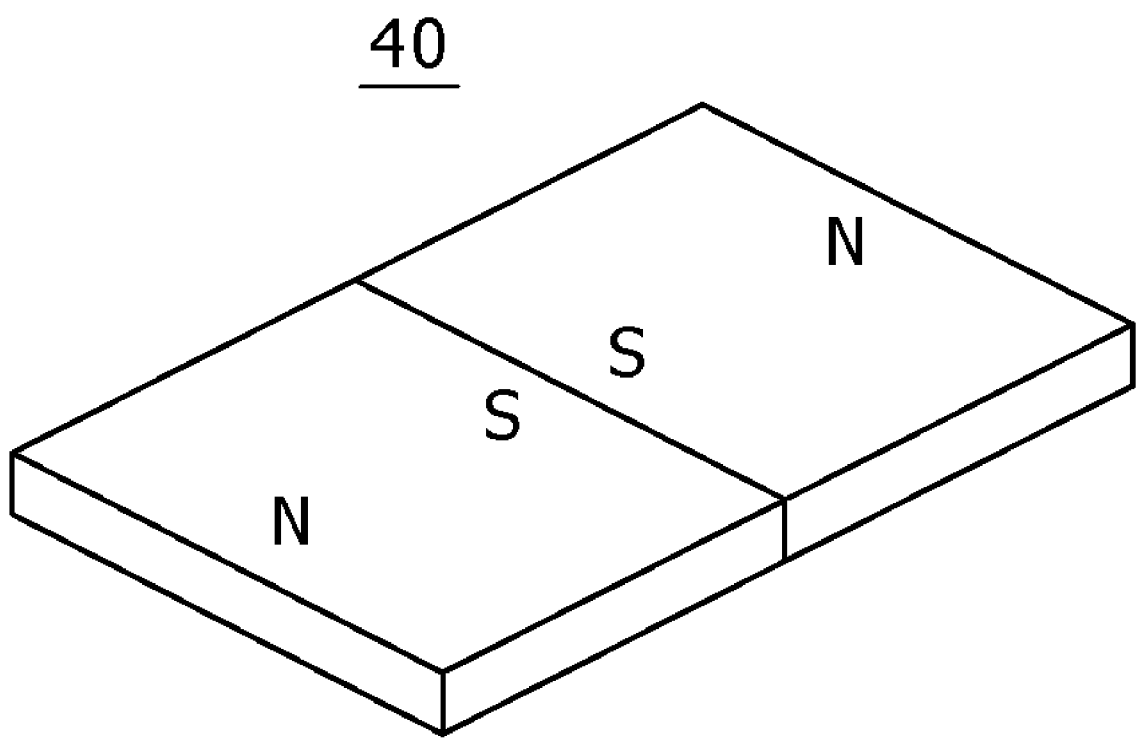
FIG. 7 is a perspective view showing a further embodiment of the magnetic field generating section.

Incidentally, in the magnetic field generating section in the position sensor according to an embodiment of the present invention, the control of bias magnetic field is not limited to that by use of a combination of both bias magnet thickness and magnetic polarization sense as mentioned above, and may be a control by use of either one of bias magnet thickness and magnetic polarization sense. In addition, the magnetic field generating section 30 is not limited to the above-mentioned combination of a plurality of members, and may be formed as an integral body having a shape similar to the above-mentioned. Furthermore, paying attention to the magnetic field generating section in which the bias magnets differ in magnetic polarization sense as above-described, it may be contemplated, for example, to adopt a configuration as shown in FIG. 7 in which the above-mentioned absolute layer bias magnet member 31 is omitted, and two thin plate-shaped permanent magnets different in magnetic polarization sense are used to constitute a magnetic field generating section 40. In that case, also, the same effects as above-mentioned can be attained.

Incidentally, the present invention is not limited to the above-described embodiments, and, naturally, various modifications are possible without departure from the scope of the gist of the invention.

What is claimed is:

1. A position sensor comprising:
    a magnetic recording medium including two incremental layers and an absolute layer, said absolute layer provided laterally between said incremental layers, each of said layers having magnetic information recorded therein; and
    magnetic detection means including three magnetoresistance effect devices respectively opposite to said layers of said magnetic recording medium, being moved relative to said magnetic recording medium in the extending direction of said layers, and being operative to detect said magnetic information in said layers by said magnetoresistance effect devices,
    wherein,
        said magnetic detection means has three bias magnetic field generating means disposed respectively opposite to said magnetoresistance effect devices and operative to generate bias magnetic fields corresponding to said magnetoresistance effect devices, and
        said bias magnetic field generating means opposite said magnetoresistance effect device opposite said absolute layer is configured to generate a bias magnetic field different than those generated by the other bias magnetic field generating means.

2. A position sensor comprising:
    a magnetic recording medium including two incremental layers and an absolute layer, said absolute layer provided between said incremental layers, each of said layers having magnetic information recorded therein; and
    magnetic detection means including three magnetoresistance effect devices respectively opposite to said layers of said magnetic recording medium, being moved relative to said magnetic recording medium in the extending direction of said layers, and being operative to detect said magnetic information in said layers by said magnetoresistance effect devices, wherein, said magnetic detection means has three bias magnetic field generating means disposed respectively opposite to said magnetoresistance effect devices and operative to generate bias magnetic fields corresponding to said magnetoresistance effect devices, and said bias magnetic field generating means includes a bias magnet differing in thickness according to said magnetoresistance effect devices of said magnetic detection means opposed to said layers of said magnetic recording medium.

3. A position sensor comprising:

a magnetic recording medium including two incremental layers and an absolute layer, said absolute layer provided between said incremental layers, each of said layers having magnetic information recorded therein; and magnetic detection means including three magnetoresistance effect devices respectively opposite to said layers of said magnetic recording medium, being moved relative to said magnetic recording medium in the extending direction of said layers, and being operative to detect said magnetic information in said layers by said magnetoresistance effect devices, wherein, said magnetic detection means has three bias magnetic field generating means disposed respectively opposite to said magnetoresistance effect devices and operative to generate bias magnetic fields corresponding to said magnetoresistance effect devices, and said bias magnetic field generating means includes a plurality of bias magnets differing in magnetic polarization sense according to said magnetoresistance effect devices of said magnetic detection means opposed to said layers of said magnetic recording medium.

4. A bias magnetic field generating device configured for a position sensor comprising (a) a magnetic recording medium including two incremental layers and an absolute layer, said absolute layer provided between said incremental layers, each of said layers having magnetic information recorded therein; and (b) magnetic detection means including three magnetoresistance effect devices respectively opposite to said layers of said magnetic recording medium, being moved relative to said magnetic recording medium in the extending direction of said layers, and being operative to detect said magnetic information in said layers by said magnetoresistance effect device, wherein, said bias magnetic field generating device has three bias magnetic field generating means disposed respectively opposite to said magnetoresistance effect devices of said magnetic detection means and operative to generate bias magnetic fields corresponding to said magnetoresistance effect devices, and said bias magnetic field generating means opposite said magnetoresistance effect device opposite said absolute layer is configured to generate a bias magnetic field different than those generated by the other bias magnetic field generating means.

5. A bias magnetic field generating device configured to for a position sensor comprising (a) a magnetic recording medium including two incremental layers and an absolute layer, said absolute layer provided between said incremental layers, each of said layers having magnetic information recorded therein; and (b) magnetic detection means including three magnetoresistance effect devices respectively opposite to said layers of said magnetic recording medium, being moved relative to said magnetic recording medium in the extending direction of said layers, and being operative to detect said magnetic information in said layers by said magnetoresistance effect device, wherein, said bias magnetic field generating device has three bias magnetic field generating means disposed respectively opposite to said magnetoresistance effect devices of said magnetic detection means and operative to generate bias magnetic fields corresponding to said magnetoresistance effect devices, and said bias magnetic field generating means includes a bias magnet differing in thickness according to said magnetoresistance effect devices of said magnetic detection means opposed to said layers of said magnetic recording medium.

6. A bias magnetic field generating device configured for a position sensor, said position sensor comprising (a) a magnetic recording medium including two incremental layers and an absolute layer, said absolute layer provided between said incremental layers, each of said layers having magnetic information recorded therein; and (b) magnetic detection means including three magnetoresistance effect devices respectively opposite to said layers of said magnetic recording medium, being moved relative to said magnetic recording medium in the extending direction of said layers, and being operative to detect said magnetic information in said layers by said magnetoresistance effect device, wherein, said bias magnetic field generating device has three bias magnetic field generating means disposed respectively opposite to said magnetoresistance effect devices of said magnetic detection means and operative to generate bias magnetic fields corresponding to said magnetoresistance effect devices, and said bias magnetic field generating means includes a plurality of bias magnets differing in magnetic polarization sense according to said magnetoresistance effect devices of said magnetic detection means opposed to said layers of said magnetic recording medium.

* * * * *